May 16, 1950  A. H. GOETSCH  2,507,900
UNDERWATER METER LEVELING DEVICE
Filed May 16, 1946
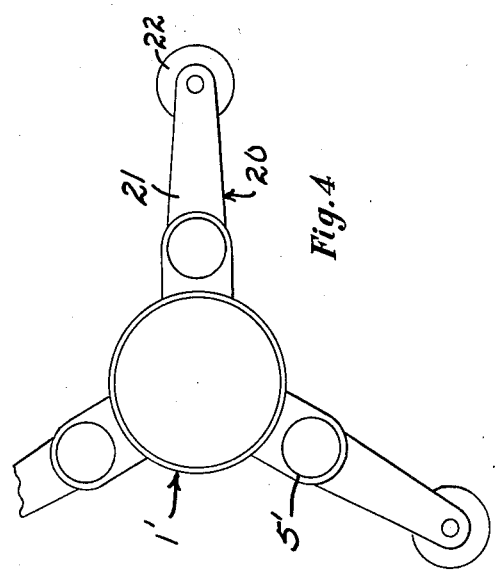
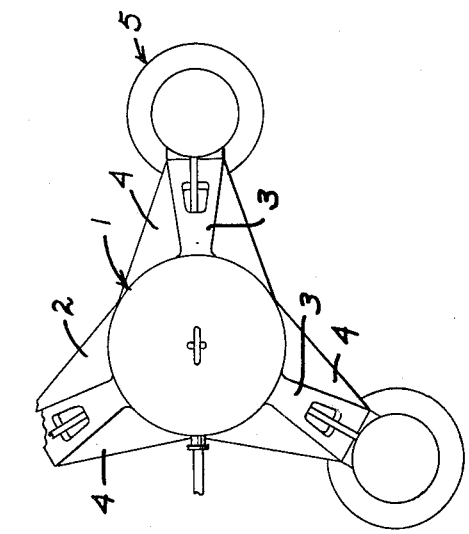
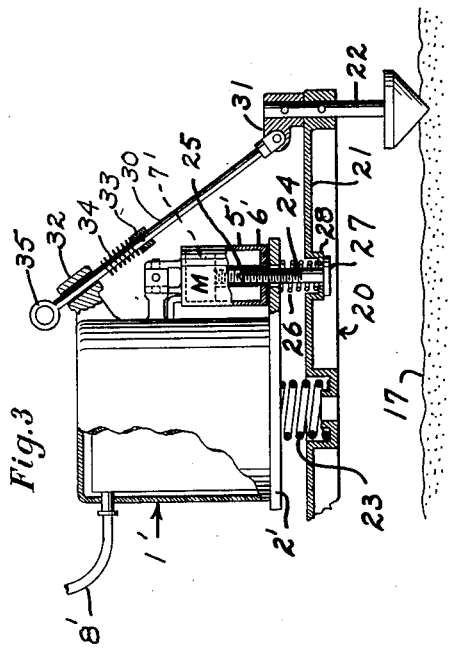
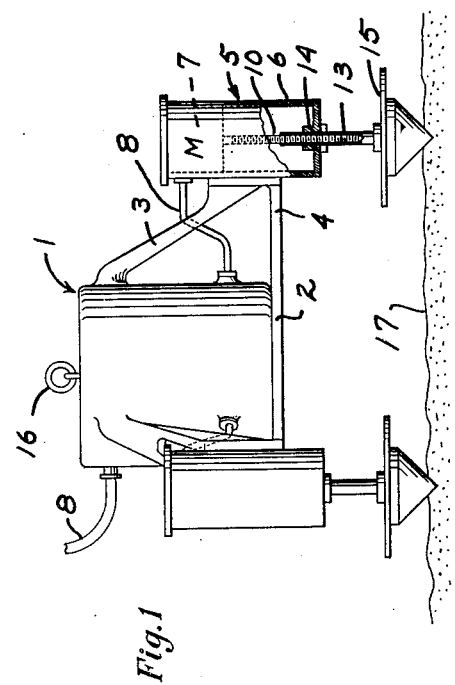
A. H. GOETSCH
Inventor
By *Lester B. Clark*
  *Ray L. Smith*
Attorneys Patented May 16, 1950

2,507,900

UNITED STATES PATENT OFFICE 2,507,900

UNDERWATER METER LEVELING DEVICE

Arnold H. Goetsch, Houston, Tex., assignor, by mesne assignments, to La Coste and Romberg, Austin, Tex., a partnership Application May 16, 1946, Serial No. 670,268

5 Claims. (Cl. 248—23)

This invention relates to apparatus for submarine geophysical prospecting, and is more particularly concerned with the provision of means for supporting a prospecting instrument upon a submerged surface and for leveling such instrument so that an observation can be made whereby information of subsurface geological structures is made available.

While the invention may be of utility in connection with the use of various types of prospecting instruments over submerged areas, it is of particular utility in prospecting with the gravimeter which, as is well known, is capable of measuring variations in the force of gravity existing by virtue of variations in subsurface geological structures.

The primary object of the invention is to provide a prospecting instrument including a support having means operable from a remote point for effecting rapid and accurate leveling of the instrument so that desired readings may be obtained from the instrument.

Another object is to provide an instrument support having spaced jack housings with power means therein and an axially movable spindle extending outwardly of each of the housings and operable by such means to move the support to a level position.

Still another object is to provide a leveling device including a support having spaced housings, a spindle extending outwardly and downwardly from within each of such housings, a foot on each of the spindles and power means in each housing for moving the spindle outwardly and inwardly thereof.

It is also an object to provide a leveling device which will resiliently support a prospecting instrument and thus protect the instrument from shocks.

Still another object is to provide a base and a support resiliently mounted thereon, such support including spaced jacks controllable to vary the distance between the support and the base.

The invention also comprehends the provision of interconnected base and support elements and a spring interposed therebetween, there being jacks mounted upon one of the elements to exert a force tending to move the elements toward each other whereby the support element is tiltable relative to the base and may thereby be removed to a level position.

A still further object is to provide a prospecting instrument and mounting therefor including lift elements having resilient stops to safely resist tilting of the instrument when the entire assembly is hoisted.

The foregoing objects together with other objects and advantages of the invention will be more fully apparent from the following description considered in connection with the accompanying drawings in which:

Fig. 1 is a side elevational view partly in section showing one form of the invention;

Fig. 2 is a plan view of the device shown in Fig. 1;

Fig. 3 is a partial side elevational and part sectional view of an alternate construction embodying the invention;

Fig. 4 is a plan view of the structure shown in Fig. 3, the lifting elements for the device being omitted for the sake of clarity.

Referring first to Fig. 1, the invention is shown as comprising a device including an enclosure or container 1 within which a prospecting instrument such as a gravimeter is enclosed. The instrument assembly includes support 2 upon which the container 1 rests and is held in position thereon by arms 3 secured to each the container and the support.

The support 2 is preferably triangular in shape to provide a tripod type of structure and has mounted at the outer ends of each of the arms 4 thereof, a jack 5. The housing 6 for the jack encloses a prime mover such as a motor 7 supplied with energy through the cable 8 leading to a control point whence leveling operations, as hereafter further explained, and operation of the prospecting instrument within the container 1 are effected.

The prime mover 7 has a shaft 10 extended outwardly therefrom and threaded to receive complemental threads on spindle 13 which passes through a stuffing box 14 in the lower end of the housing 6. The lower end of the spindle is provided with a suitable foot such as that shown at 15, it being intended that this foot shall engage the surface upon which the instrument is to be placed and to provide adequate support therefor.

Since the device of the invention is used in prospecting over submerged areas, operations are usually carried out from a vessel on the submerging medium. In using the device of the invention as thus far described, hoisting equipment on the supporting vessel will be connected to the hoisting ring 16 on the device to effect desired lowering thereof to the submerged surface 17. As the device is lowered, the control cable 8 will, of course, be veered so as to maintain control of the instrument from the vessel.

It is understood that suitable means known in the art, such, for example, as that shown in Patent No. 2,253,472 is provided for indicating the condition of levelness of the instrument within the container 1. In order to level the instrument, control current to the respective prime movers 7 is supplied through the cable 8 to rotate the respective shafts 10 in the proper directions and amounts. Such rotation causes the spindles 13 to move outwardly and inwardly of the housings 6 and in this manner desired leveling of the prospecting instrument is effected.

In the embodiment shown in Figs. 3 and 4, the support 2' for the enclosure or container 1' has jacks 5' comprising an element thereof. In this form, however, there is provided a base 20 having outwardly extending arms 21 to which foot assemblies 22 are secured. Interposed between the base 20 and the support 2' is a compression spring 23. This spring may be of sufficient strength to entirely support the assembly thereabove, but is preferably of such strength that the force exerted thereby together with the buoyancy of the container 1' will tend to cause the instrument assembly to move upwardly from the base.

It is intended that the jacks 5' shall overcome the upward force exerted by the spring 23 and the buoyancy of the container 1' by exerting tension upon the rod 24 which extends outwardly from within the housing 6'. The upper end of this rod is threadably connected to the hollow shaft 25 of the motor 7'. A spring 26 surrounds each of the rods 24 and these springs exert sufficient force to prevent tilting of the instrument when in normal use. These springs also assure that the head 27 of the shaft 24 is held in engagement with the nether surface of the boss 28 on the base 20, and also that there will be no back lash in the threaded connection between the rod and the shaft 25.

Lifting links 30 are pivotally attached to ears 31 secured to the upper ends of the foot assemblies 22. Each of the links passes slidably through a boss 32 formed upon the container 1'. A stop collar 33 and spring 34, together with the respective springs 26, limit tilting movement of the instrument whenever hoisting is being effected through means connected to the eyes 35 at the upper ends of the links 30. In this manner the instrument is protected against impacts to which it may be subjected during normal use.

It is understood that current is supplied through the cable 8' to the respective motors 7 so that the hollow shafts 25 are threaded upwardly or downwardly upon the rod 24 whereby necessary tilting action is effected to level the instrument. It also seems apparent that the manner of supporting the instrument assembly upon the base 20 is such as to provide adequate flexibility of the device for prospecting operations and also protects the instrument against shock.

Broadly the invention comprehends a prospecting instrument for use upon a submerged surface and including means controllable from a remote point for leveling such instrument.

The invention claimed is:

1. In a device of the class described, a support, a base, means for resiliently urging the support to spaced relation from the base, and additional means for adjustably applying tension between the support and base at a plurality of points to vary the angular relation therebetween and level the support.

2. In a device of the class described, a support, a base, means for resiliently urging the support to spaced relation from the base, jacks on said support, a connection between each of the jacks and the base, and means for operating the jacks to move the support to a level position.

3. Apparatus for submarine geophysical prospecting comprising in combination, a device to be leveled, a support upon which said device is mounted, a base, resilient means interposed between said support and said base, said means and the buoyancy of said device being operable to lift the device relative to the base, and spaced means on the support adjustably connected to the base to exert forces to tilt the support relative to the base and thereby move the support to a level position.

4. Apparatus for submarine geophysical prospecting comprising in combination, a device to be leveled, a support upon which said device is mounted, a base, resilient means interposed between said support and said base, said means and the buoyancy of said device being operable to lift the device relative to the base, and spaced means on the support adjustably connected to the base to exert forces to tilt the support relative to the base and thereby move the support to a level position, said additional means including springs interposed between the support and base to resist self tilting of the support and device.

5. Apparatus for geophysical prospecting comprising in combination, an assembly to be leveled, a base therefor, resilient means interposed therebetween to exert a force tending to separate the assembly and base, spaced means on the assembly for varying the distance between each such means and the base, lift members attached to the base and having slidable connections with the assembly and resilient stops on said members to engage the assembly and resiliently resist tilting of the assembly when the apparatus is lifted thereby.

ARNOLD H. GOETSCH.

REFERENCES CITED

The following references are of record in the file of this patent:

UNITED STATES PATENTS

| Number | Name | Date |
|---|---|---|
| 1,287,770 | Schmidt | Dec. 17, 1918 |
| 2,214,322 | Bryant | Sept. 10, 1940 |
| 2,223,246 | Coletti | Nov. 26, 1940 |